United States Patent [19]

Natarajan

[11] Patent Number: 5,315,509
[45] Date of Patent: May 24, 1994

[54] ARTIFICIAL INTELLIGENCE SYSTEM FOR ITEM ANALYSIS FOR REWORK SHOP ORDERS

[75] Inventor: Bharath Natarajan, Marietta, Ga.

[73] Assignee: International Business Machines Corporation, Armonk, N.Y.

[21] Appl. No.: 100,067

[22] Filed: Jul. 30, 1993

Related U.S. Application Data

[63] Continuation of Ser. No. 822,248, Jan. 17, 1992, abandoned, which is a continuation-in-part of Ser. No. 425,612, Oct. 23, 1989, abandoned.

[51] Int. Cl.$^5$ .................. G06F 15/22; G06F 15/24; G06G 7/52
[52] U.S. Cl. .................. 364/401; 364/468; 395/904
[58] Field of Search ........... 364/401, 402, 403, 468; 395/904

[56] References Cited

U.S. PATENT DOCUMENTS

| | | |
|---|---|---|
| 4,646,238 | 2/1987 | Carlson, Jr. et al. ......... 364/403 |
| 4,669,047 | 5/1987 | Chucta ..................... 364/468 |
| 4,887,206 | 12/1989 | Natarajan .................. 364/468 |
| 5,121,330 | 6/1992 | Blaha et al. ............... 364/403 |
| 5,191,534 | 3/1993 | Orr et al. ................. 364/468 |
| 5,204,821 | 4/1993 | Inui et al. ................ 364/468 |
| 5,216,612 | 6/1993 | Cornett et al. ............. 364/468 |

FOREIGN PATENT DOCUMENTS

0323382A2 5/1989 European Pat. Off. .
PCT/US85/-01092 1/1986 PCT Int'l Appl. .

OTHER PUBLICATIONS

AD Walsh and Shivell, Computer Aided Manufacturing, IEEE 1985 Compint–Computer Aided Technologies, Montreal Quebec, Canada, Sep. 9–13, 1985, pp. 577–579.

"Shop floor data acquisition and communication," *Machinery and Production Engineering:* Mar. 12, 1975, pp. 240–245.

*Primary Examiner*—Roy N. Envall, Jr.
*Assistant Examiner*—Laura Brutman
*Attorney, Agent, or Firm*—Duke W. Yee; Andrew J. Dillion

[57] ABSTRACT

A computer implemented method facilitates the capability for shop re-work orders to be effectively scheduled, knowing the time and location of item availability that is needed to correct the problem found in the re-work shop orders. The system automatically identifies alternate components or items that can be used in the shop orders and provides realistic shipping dates so that the re-work shop orders can be scheduled. If components or items are not available, the system provides feedback to the material planning system to re-plan items using traditional material planning systems such as the MRP (material requirement planning) systems and provide projected shipping dates so that re-work orders can be scheduled.

13 Claims, 2 Drawing Sheets

ARTIFICIAL INTELLIGENCE SYSTEM FOR ITEM ANALYSIS FOR REWORK SHOP ORDERS

CROSS-REFERENCE TO RELATED APPLICATION

This is a continuation of application Ser. No. 07/822,248, filed Jan. 17, 1992, now abandoned, which is a continuation-in-part of an application entitled "An Artificial Intelligence System For Item Analysis For Re-Work Shop Orders", Ser. No. 07/425,612 filed on Oct. 23, 1989, now abandoned.

The subject matter of this application is related to Pat. No. 5,099,431 filed Oct. 23, 1989 by B. Natarajan for "Automated Re-Work Shop Order Scheduling System", which is assigned to a common assignee with this application. The disclosure of that application is incorporated herein by reference.

BACKGROUND OF THE INVENTION

1. Field of the Invention

The present invention generally relates to a computer based re-work component analysis system to identify appropriate components to be used in the re-work shop orders once defective components are identified for replacement. The process includes steps for identifying replacement components after determining the engineering change (EC) level, alternate components, if any, and the location of the components for availability.

2. Description of the Prior Art

The process of designing, developing and manufacturing a new product, or making major changes to existing products, presents many challenges to product managers and manufacturing managers to bring a product to market for the least cost, within schedule, while maintaining product quality. In today's highly competitive industries, product managers and manufacturing managers require information to address many problems that arise because of the complexity of new products and the complexity of world-wide production and the changing nature of competition. The requirement that products be manufactured for the least possible cost is important in all industries. Of all costs associated with selling products and services, none is more important than the cost of customer service. When customers require items to be re-worked, or field returns, those orders require special attention and sometimes urgent attention to satisfy customer needs. As re-work orders are received from the customers for faulty components, they have to be first sorted for fault diagnosis through appropriate tests. Once the tests identify the cause of the defect, the appropriate replacement item needs to be defined. If the defective item needs to be changed, a search needs to be made as to the current EC (engineering change) level and the assigned part number, if different from the previous number. If an alternate part number has been assigned, those have to be identified. Once it is identified, the location and availability of the part has to be determined.

In a typical re-work shop order environment items that have failed inspection at the field location for any reason come to the manufacturing floor for correction and re-work. Upon arrival, items are tested for failures and any correction that needs to be made are identified.

Current planning systems such as COPICS TM (Communications Oriented Production Information and Control System) sold by IBM Corporation and similar systems marketed by MSA and Cullinet, for example, have the capability to allocate component inventory for use in re-work orders; however, these systems do not have the capability to identify replacement components based on engineering level determination. The user has to manually identify the revised engineering change number and identify the replacement component. Most often, the user on the shop floor is not aware of any engineering changes to the components that have take place. This may result in faulty or less effective components being replaced on the shop floor.

What is needed is a system that will automatically identify the replacement components based on current engineering change levels and identify the availability of replacement component(s) and their location. The automated system should also provide allocations based on availability and let the user know of the projected delivery date for start of re-work orders based on component/item ship leadtime. Planning systems such as IBM's COPICS TM product provide the capability for engineering change affectivity that identifies when an engineering change will need to be implemented. However, they do not have the capability to identify changed component number given the old component number. The production monitoring and control module within IBM's COPICS TM product provide the capability to determine the quantity of order completion. The physical capability of testing re-work orders and determining the defects in the re-work orders is considered as part of the manufacturing shop floor systems.

SUMMARY OF THE INVENTION

It is therefore an object of the present invention to provide an easy to use system that first identifies re-work items and components for availability by first checking to see if the items were replaced by new items based on engineering change and then estimates the re-work schedule date based on item/component availability.

It is another object of the invention to provide a system of the type described which, when the item component is not yet available, generates appropriate feedback to a material planning system to plan for the materials through standard planning processes, such as material requirement planning (MRP).

It is a further object of the invention to provide a system that prompts the production planner to alternate component/item availability and provide projected shipping dates for starting re-work shop orders.

The Automated Re-Work Shop Order Scheduling System disclosed in my copending application Ser. No. 07/425,611, now U.S. Pat. No. 5,099,431 uses a set of order release and dispatching rules along with a simulation of the shop floor to effectively schedule re-work shop orders. The system according to the present invention provides the capability by identifying appropriate components/item that can be used in the respective re-work orders so that they can be scheduled using the other invention.

The subject invention facilitates the capability for shop re-work orders to be effectively scheduled, knowing the time and location of item availability that is needed to correct the problem found in the re-work shop orders. The system automatically identifies alternate components or items that can be used in the shop orders and provides realistic shipping dates so that the re-work shop orders can be scheduled. If components or items are not available, the system provides feedback to the material planning system to replan items using traditional material planning systems such as the MRP (material requirement planning) systems and provide projected shipping dates so that re-work orders can be scheduled.

BRIEF DESCRIPTION OF THE DRAWINGS

The foregoing and other objects, aspects and advantages will be better understood from the following detailed description of a preferred embodiment of the invention with reference to the drawings, in which:

FIG. 3 is a block diagram that illustrates the relative position of the user with respect to the re-work scheduling system and a relational database.

DETAILED DESCRIPTION OF A PREFERRED EMBODIMENT OF THE INVENTION

Figure 1:
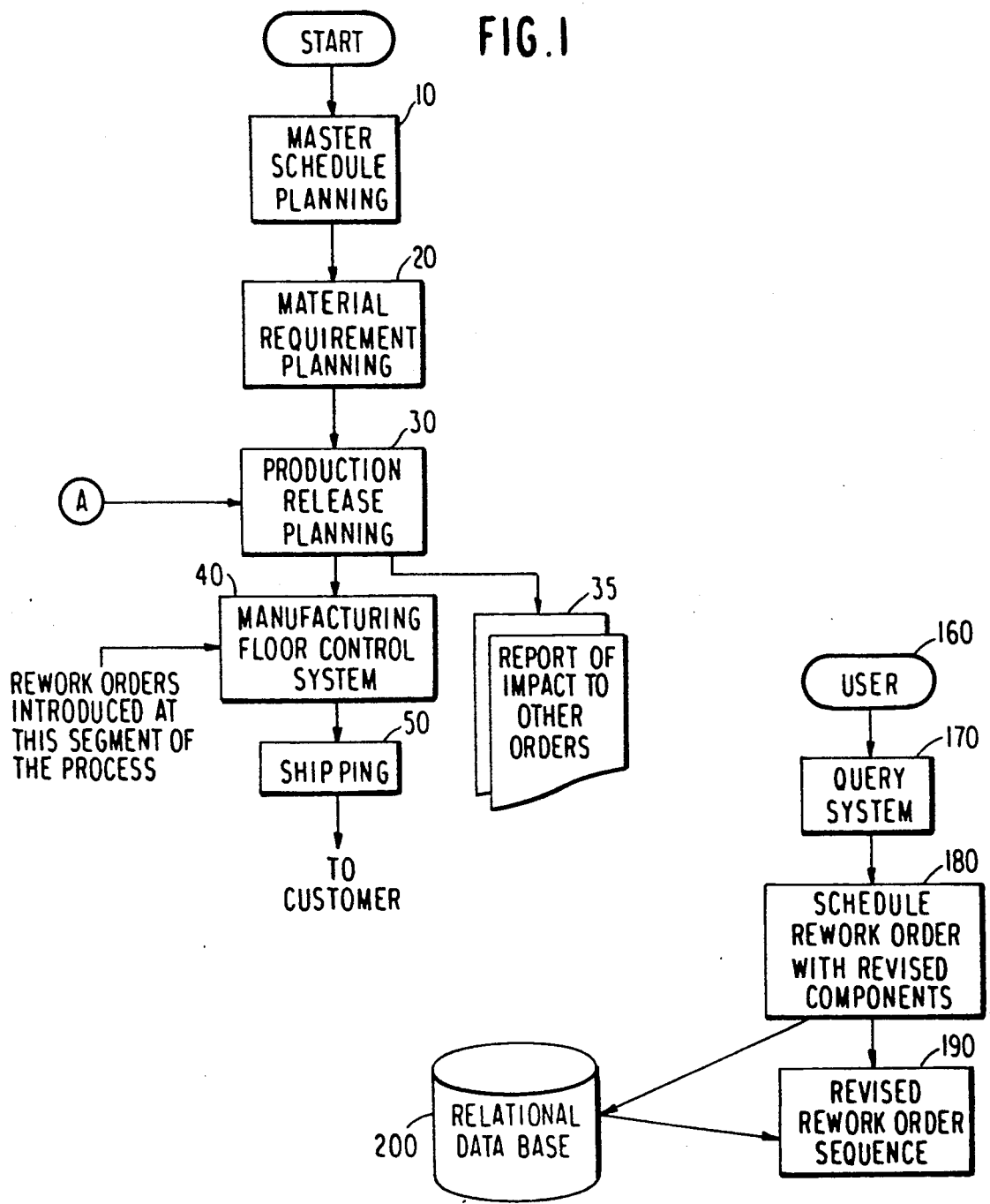
FIG. 1 is a system block diagram of the total manufacturing process from planning through execution.

Referring now to the drawings, and more particularly to FIG. 1 there is shown in functional block diagram form the processes that take place in a typical manufacturing environment from the time of planning through production and shipment. The key parts of the system include Master Schedule Planning 10, where items are planned at the completed item level, a Material Requirement Planning (MRP) system 20, where completed item requirements are exploded into subcomponents and planned, and the Production Release System 30, where shop orders planned at the material requirement planning level are set for releasing to the shop floor. The next part of the system, the manufacturing floor control system 40, is the segment of the process where re-work orders are introduced and where the scheduling of the orders takes place. This is the segment of the process which is addressed by the present invention. The next block is the Shipping segment 50 where items are shipped to the customer as in any corporate enterprise.

The processes shown in block diagram form in FIG. 1 are shown only as a reference to indicate the positioning of the problem of re-work component analysis. It is not the intent of the present description to define these traditional applications. Many systems are commercially available which address these applications.

Figure 2:
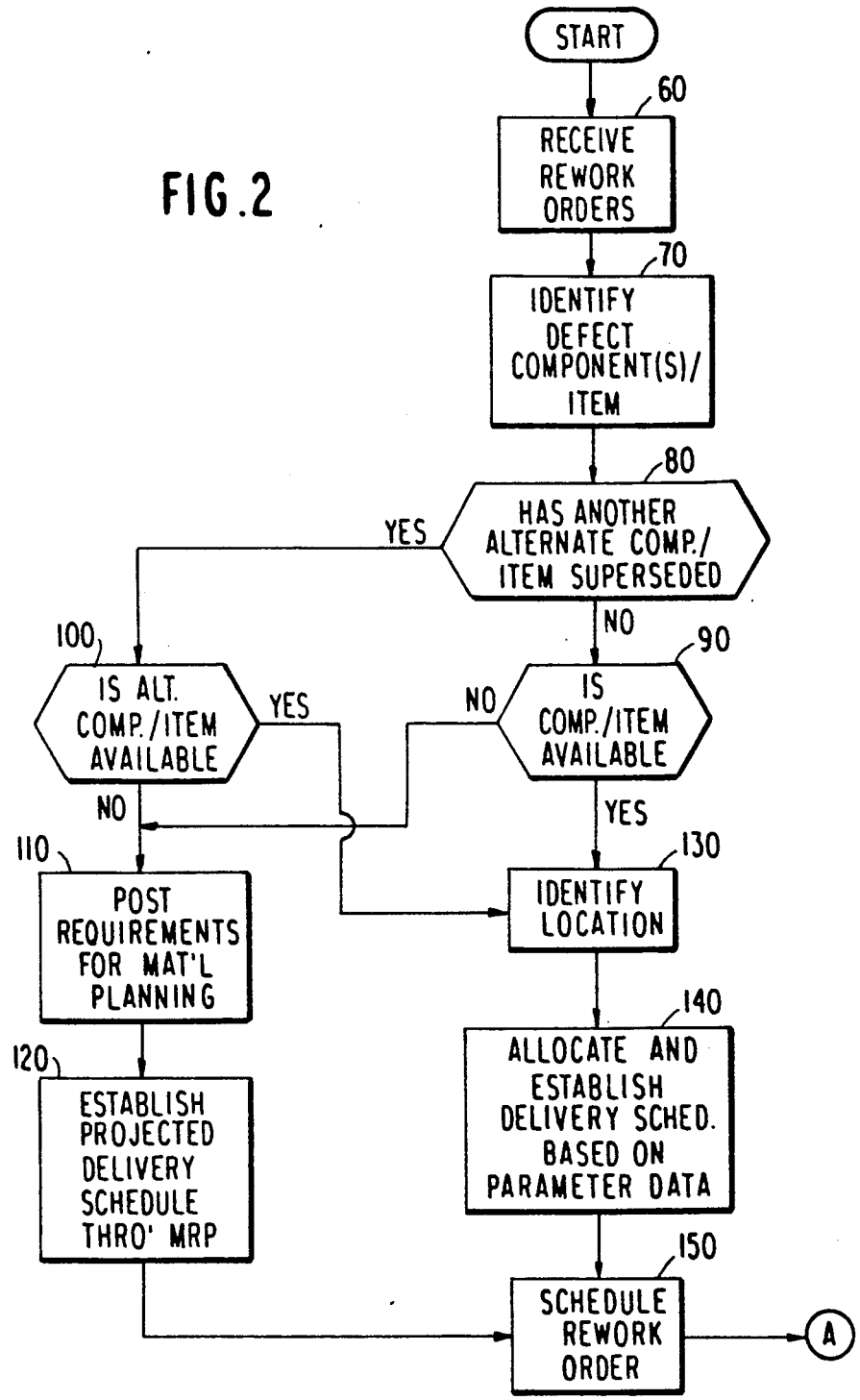
FIG. 2 is a block diagram that illustrates the logical steps involved in determining the re-work shop order components or items that are needed to replace defective components or items found in the re-work shop orders.

FIG. 2 illustrates the logic of the component identification system when re-work orders are introduced as part of the floor scheduling system 40. The logic described involves analysis of the database to identify if an alternate component or item has been identified for the defective component or item. If so, the system identifies the component or item and checks for availability. If the component or item is not available, the system requests the component or item in question to be re-planned as part of the next material planning cycle 20.

The process begins at function block 60 where re-work orders are received. Defective components or items are identified in function block 70. When re-work orders come from the customer, the faulty components or items are first diagnosed for the cause of the defects. This process will vary from item to item depending on the item and the process associated with it. In decision block 80, a test is made to determine whether the item in question has been changed or superseded by another alternate item due to any engineering change. If it has not changed, a check is made in decision block 90 to determine if the item is available for use. If an alternate item has been defined, a test is made in decision block 100 to determine if the new item is available in inventory. If either the original item or the alternate item is available, the location of availability is determined from the inventory database, as indicated by function block 130.

It is appropriate to point out that the user would query against a host database such as IBM Corporation's COPICS TM product or that of similar products. If the item in question is available, the parameter data associated with the item would provide information regarding the availability. This is indicated by function block 140. If the item(s) are not available, they have to be replanned in a process such as MRP as shown in FIG. 1 at block 20. Such MRP system will project component availability through an interface to traditional purchasing systems. More specifically, feedback to the MRP system is provided to the MRP system to post the requirements for material planning in function block 110. The MRP system then establishes a delivery schedule in function block 120.

Once the items are identified for availability, the re-work shop orders can be scheduled, as indicated in function block 150. A detailed description of scheduling re-work shop orders is presented in my copending application Ser. No. 07/425,611 which is now U.S. Pat. No. 5,099,431. The connector A. indicates feedback to the production release planning system 30 in FIG. 1. In response to this feedback, the production release planning system generates and displays to the user a report of impact to other orders at 35. The item analysis work may involve evaluating to following scenarios:

1. Items may not be available inhouse. An evaluation needs to be made as to the location where the item can be located.

2. There may be alternate components available which needs to be verified by location identified.

3. The replacement item may have a different engineering change/revision level which needs to be identified. If so, replacement component must be identified.

4. Identify if item has changed the part number and define location of the new part number. Items may be in multiple (varied) locations.

Under a preferred embodiment of the present invention, item analysis for re-work shop orders may be implemented in a knowledge based or artificial intelligence system. The rules utilized in a knowledge based or artificial intelligence system for indentifying re-work shop items or components to replace defective items or components in accordance with a preferred embodiment of the present invention are illustrated by a high-level description of the rules implemented into pseudo code in accordance with a preferred embodiment of the present invention as follows:

Rework_item=Defined_available item per engineering or defective_item change at defined location.

If re-work item or component is identified as tested defective, follow the rules below.

Identify location of defective_item

If defective item is available, then rework_item is the available item.

If defective_item is not available, determine whether defective_item has an engineering change, identify the defective_item's engineering change level.

If defective_item with engineering change is available, then re-work item is the available item.

If defective_item with engineering change is not available determine whether an alternate component has been established.

If the defective_item has alternate component established, identify the alternate component number.

Identify the alternate component location and the location of original defective component.

If alternate component is available, available item=re-work item.

If alternate component is not available, determine whether alternate component has an engineering change.

If alternate component has an engineering change identify the component number of alternate component with engineering change.

Identify the location of the alternate component with engineering change.

If alternate component with engineering change is available, available item=re-work item.

If defective_item is not available, identify alternate item.

Identify location of alternate_item.

Evaluate if alternate_item is available.

If alternate_item is available, available_item=Rework_item

If defective_item, alternate component and alternate item is not available.

Exit the system with the following message.

Message: item/alternate component/item not available

In identifying the location of components or items under the rules implemented into the pseudo code, primary and secondary sites or sources for the items or components are identified. Then, in determining availability of items or components the primary site is checked, and if the item or component is not available at the primary site, then secondary sites are checked for item or components availability. Under the rules illustrated above, an "alternate component" is an item or component that has a different design from the originally defective component, but performs the same function as the defective component. An "alternate item" is an item or component that may be utilized to replace the defective_item. The "alternate item" performs the function required to satisfy the function performed by the defective item or component, but also performs other additional functions. An "alternate item" is, however, only utilized for the function performed by the defective item or component. With all the engineering changes that may occur and all the alternate items or components available, this item rework analysis would be difficult to accomplish without a knowledge based or artificial intelligence system to identify and locate alternate items and alternate components.

FIG. 3 illustrates the key parts of the system from the user point of view. The key parts are the database 200 and the query system 170. The database can be any of several products currently available, but for the purpose of the preferred embodiment, IBM Corporation's Database 2 (DB2) is used. DB2 is a relational database system, but it will be understood by those skilled in the art that other databases, including hierarchical databases, could be used. General information on IBM's DB2 can be had with reference to publication GC26-4073-2 published by IBM Corporation. The query system can be an expert system, but for purposes of the preferred embodiment of this invention, IBM's structured extended executor (REXX) language is used. A description of the REXX language is provided in "Virtual Machine/Systems Product, System Product Interpreter User's Guide", Release 4, publication SC24-5238-2, published by IBM Corporation.

The user 160 can query the current status, completion date and the priority sequence of any job in question using the query system 170. The query system 170 interfaces with the Schedule re-work order with revised component/item module 180 which accesses the database 200 and arrives at the revised schedule. The block 180 reflects the essence of the logic as illustrated in FIG. 2. The database 200 as defined has the capability to capture the decision variables tested and the results obtained for each test. The user can access the results using the query facility at a later date, if needed, and obtain an output in the form of a revised order sequence for dispatch block 190. This enhances the analysis capability of future test data. This also provides an additional enhancement to the system.

When re-work shop order are introduced in the production process, the operations manager is very concerned about the order as well as other orders on the shop floor. He or she would also be concerned with the excessive work-in-process inventory and the cycle time needed to complete all orders on the shop floor. This order schedule system gives the manager the needed capability to recover from the situation, if possible, or suggest the best alternative. Having taken a course of action as analyzed by the production dispatch system, the planning system and the production release system need to be informed of the revised plan and status of the operation centers in order to effectively plan future orders. This is illustrated by the connector A in FIGS. 1 and 2 and is an added enhancement to the system provided by the invention.

The decision making capability to define the correct component or item based on revisions or alternatives that might have superseded an existing component or item due to engineering changes provides the artificial intelligence to the system.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A data processing system for item analysis for re-work shop orders generated by a re-work order scheduling process, said data processing system comprising:

monitoring means for detecting a re-work order generated by a re-work order scheduling process for an entire shop floor, wherein said re-work order identifies a defective item;

identification means, responsive to a detection of a re-work order, for identifying a replacement item;

polling means for determining if said replacement item is available; and allocation means for allocating said replacement item and establishing a delivery schedule for said allocated replacement item.

2. The data processing system of claim 1, wherein said identification means includes:
- means for determining if said item defective has an engineering change; and
- means, responsive to a presence of an engineering change, for identifying a new item as said replacement item based on said engineering change.

3. The data processing system of claim 1, wherein said allocation means includes means for identifying a location of said replacement item.

4. The data processing system of claim 3, further comprising means for automatically providing said delivery schedule to a production release planning system in response to an establishment of said delivery schedule.

5. The data processing system of claim 1, further comprising means, responsive to an unavailability of a replacement component, for providing feedback to a material planning system to re-plan said unavailable replacement item and establishing a projected delivery schedule based on material planning system outputs.

6. A method for item analysis, said method providing for the automatic identification of a replacement item for a defective item identified in a re-work order created by a re-work order scheduling process, said method comprising the computer implement steps of:
- monitoring a re-work order scheduling process for re-work orders generated by said re-work order scheduling process;
- identifying a replacement item for said defective item in response to an occurrence of a re-work order by
  - designating an item as replacement item if said item identical to said defective item is available,
  - determining if a new item has superseded said item utilizing an engineering change in response to an unavailability of said item,
  - determining if said new item is available if said new item has superseded said item,
  - designating said new item as said replacement item if said new item is available,
  - selecting an alternate item having the same function as the defective item in response to an unavailability of said new item, and
  - designating said alternate item as said replacement item if said alternate item is available; and
- allocating said replacement item for delivery and establishing a delivery schedule for said replacement item in response to an identification of said replacement item, wherein uniform identification of replacement items may be provided.

7. The method of claim 6, further comprising providing said delivery schedule to a production release planning system in response to an establishment of said delivery schedule.

8. The method of claim 6, wherein if said replacement item is not available, performing the steps of:
- providing feedback to a material planning system to re-plan the items that are not currently available; and
- establishing a projected delivery schedule based on material planning system outputs.

9. A data processing system for item analysis for re-work shop orders, said data processing system comprising:
- monitoring means for detecting a re-work order generated by a re-work order scheduling process, wherein said re-work order identifies a defective item;
- analysis means, responsive to a detection of a re-work order, for identifying a replacement item including:
  - means for determining a presence of an engineering change for said defective item; and
  - means for selecting a new item as said replacement item based on said engineering change in response to a presence of said engineering change for said defective item;
- polling means for determining if said replacement item is available; and
- allocation means for allocating said replacement item for use and establishing a delivery schedule for said replacement item.

10. The data processing system of claim 9 further comprising means responsive to an unavailability of a replacement components for providing feedback to a material planning system to re-plan said unavailable replacement item and means for establishing a projected delivery schedule based on material planning system outputs.

11. A data processing system for item analysis for re-work shop orders, said data processing system comprising:
- monitoring means for monitoring re-work orders for a shop floor;
- an artificial intelligence means for identifying a replacement item for said defective item in response to an occurrence of a re-work order, including:
  - means for designating an item as replacement item if said item identical to said defective item is available,
  - means for determining if a new item has superseded said item utilizing an engineering change in response to an unavailability of said item,
  - means for determining if said new item is available if said new item has superseded said item,
  - means for designating said new item as said replacement item if said new item is available,
  - means for selecting an alternate item having the same function as the defective item in response to an unavailability of said new item, and
  - means for designating said alternate item as said replacement item if said alternate item is available; and
- allocation means for allocating said replacement item for delivery and establishing a delivery schedule for said replacement item in response to an identification of said replacement item, wherein uniform identification of replacement items for a shop floor may be provided.

12. The data processing system of claim 11, further comprising means for providing said delivery schedule to a production release planning system in response to an establishment of said delivery schedule.

13. The data processing system of claim 11 further comprising
- feedback means, responsive to an unavailability of a replacement item replacement item, for providing feedback to a material planning system to re-plan the items that are not currently available; and
- projection means for establishing a projected delivery schedule based on material planning system outputs, responsive to an unavailability of a replacement item replacement item.

* * * * *